US011165971B1

United States Patent
Kannan et al.

(10) Patent No.: US 11,165,971 B1
(45) Date of Patent: Nov. 2, 2021

(54) SMART CONTACT LENS BASED COLLABORATIVE VIDEO CAPTURING

(71) Applicant: INTERNATIONAL BUSINESS MACHINES CORPORATION, Armonk, NY (US)

(72) Inventors: Nalini Kannan, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/122,376

(22) Filed: Dec. 15, 2020

(51) Int. Cl.
| H04N 5/225 | (2006.01) |
| H04N 5/268 | (2006.01) |
| H04N 5/247 | (2006.01) |
| G02C 7/04 | (2006.01) |
| H04B 5/00 | (2006.01) |

(52) U.S. Cl.
CPC .............. H04N 5/268 (2013.01); G02C 7/04 (2013.01); H04B 5/0031 (2013.01); H04N 5/2257 (2013.01); H04N 5/247 (2013.01)

(58) Field of Classification Search
CPC ...... H04N 5/268; H04N 5/247; H04N 5/2257; H04B 5/0031; G02C 7/04
See application file for complete search history.

(56) References Cited

U.S. PATENT DOCUMENTS

| 2006/0227067 A1* | 10/2006 | Iwasaki ................. G02C 7/04 345/8 |
| 2014/0243971 A1* | 8/2014 | Pugh .................... A61F 2/1624 623/6.22 |
| 2016/0097940 A1 | 4/2016 | Sako |
| 2016/0252956 A1 | 9/2016 | Wheeler |
| 2016/0293210 A1* | 10/2016 | Tang ....................... G06T 7/20 |
| 2017/0092007 A1 | 3/2017 | Goldberg |
| 2017/0199377 A1* | 7/2017 | Ekambaram ....... G02B 27/0101 |
| 2020/0162698 A1 | 5/2020 | Rakshit |

OTHER PUBLICATIONS

Wikipedia, "Blinking", printed on Jul. 20, 2020, 4 Pages, https://en.wikipedia.org/wiki/Blinking.
Starr, "Sony Patents Contact Lens That Records What You See", CNET, May 2, 2016, 5 Pages, https://www.cnet.com/news/sony-patents-contact-lens-that-records-what-you-see/.
Moyer, "When Eye Blinking Is a Problem", Aug. 8, 2019, 13 Pages, https://www.healthline.com/health/eye-health/eye-blinking#causes.
(Continued)

Primary Examiner — Mekonnen D Dagnew
(74) Attorney, Agent, or Firm — Anthony M. Pallone

(57) ABSTRACT

An embodiment of the invention may include a method, computer program product and system for collaborative video capturing via multiple smart contact lenses. An embodiment may include identifying a participant, of multiple participants, currently capturing video via a smart contact lens of the identified participant. In response to a predicted next eye closing event for the identified participant, an embodiment may include transferring current video capture to a smart contact lens of another participant, of the multiple participants, during the predicted next eye closing event for the identified participant.

20 Claims, 7 Drawing Sheets

(56) References Cited

OTHER PUBLICATIONS

Bolton, "Samsung Patents Design for "Smart" Augmented Reality Contact Lenses", Apr. 6, 2016, 7 Pages https://www.independent.co.uk/life-style/gadgets-and-tech/news/samsung-smart-contact-lenses-patent-a6971766.html.

Bernal, "Samsung patents 'smart' contact lenses that record video and let you control your phone just by blinking", The Telegraph, Aug. 6, 2019, 3 Pages, https://www.telegraph.co.uk/technology/2019/08/06/samsung-patents-smart-contact-lenses-record-video-let-control/.

Mell et al., "The NIST Definition of Cloud Computing", Recommendations of the National Institute of Standards and Technology, NIST Special Publication 800-145, Sep. 2011, 7 pages.

\* cited by examiner

SMART CONTACT LENS BASED
COLLABORATIVE VIDEO CAPTURING

BACKGROUND

Embodiments of the present invention relate generally to the field of wearable technology, and more specifically, to capturing video via one or more camera equipped smart contact lenses paired to a mobile device.

Video typically plays more than 24 subsequent images (i.e., frames) per second with each frame being called a video frame. A typical blinking duration for a person is 0.1-0.4 seconds per blinking event, during which the person's eyelid will be closed and therefore a camera of the smart contact lens will not be able to capture video. Consequently, 2-10 frames of video captured by the smart contact lens will be black as a result of blinking events. A blinking event will happen on average 10 times per minute for a given person. Also, there can be additional eye closing events due to eye irritation, change of focus, etc. These blinking events and additional eye closing events will reduce the quality of the video captured with a camera equipped smart contact lens as there will be interruptions in the captured video.

BRIEF SUMMARY

An embodiment of the invention may include a method, computer program product and system for collaborative video capturing via multiple smart contact lenses. An embodiment may include identifying a participant, of multiple participants, currently capturing video via a smart contact lens of the identified participant. In response to a predicted next eye closing event for the identified participant, an embodiment may include transferring current video capture to a smart contact lens of another participant, of the multiple participants, during the predicted next eye closing event for the identified participant.

DETAILED DESCRIPTION

Figure 1A:
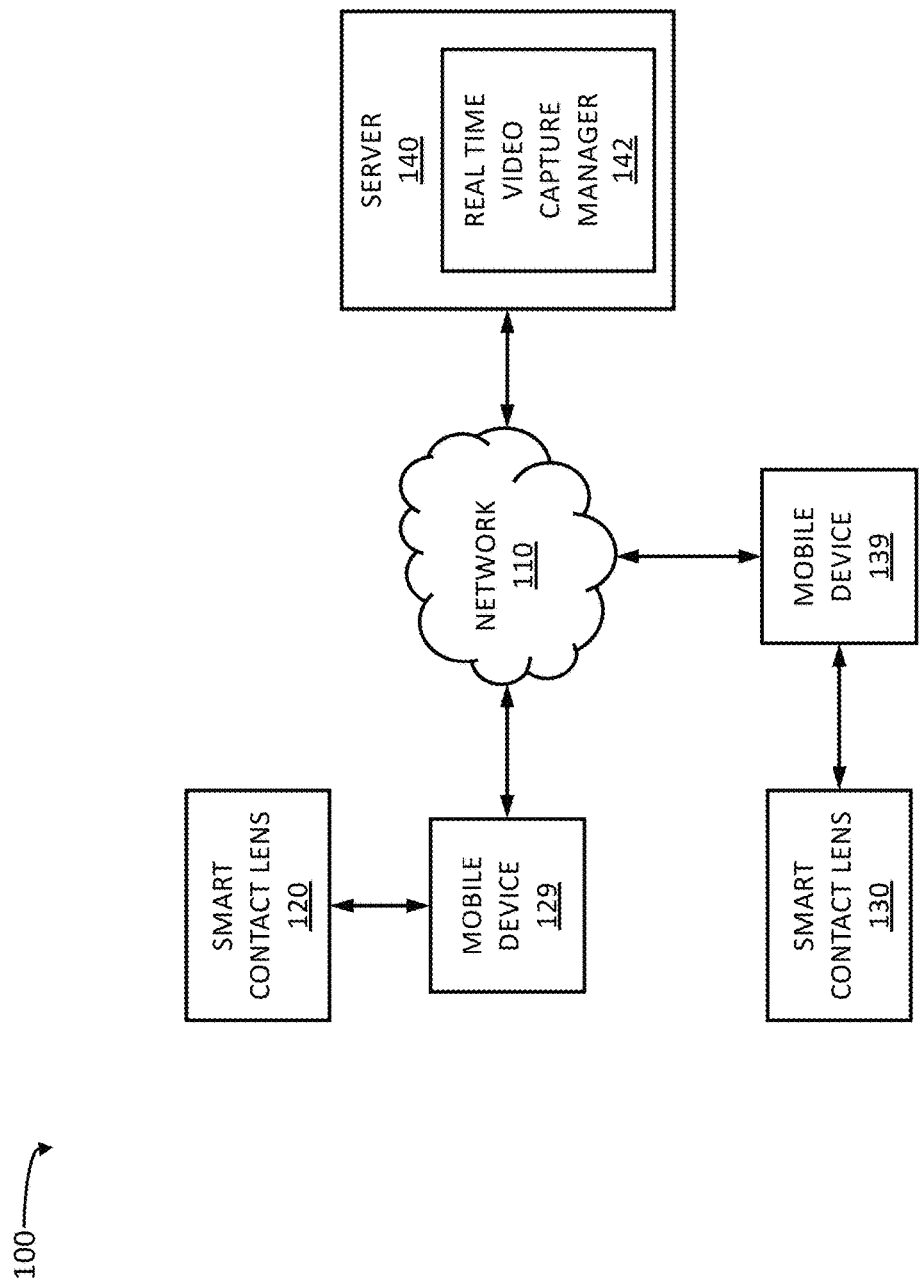
FIG. 1A is a block diagram illustrating a Collaborative Video Capture (CVC) System, in accordance with an embodiment of the present invention.

A smart contact lens having the capability to record video enables what a person sees in their surrounding environment to be recorded in a video file that can be stored within a paired mobile device or within cloud storage. However, a complete video recording (e.g., an uninterrupted recording, no missed or black video frames) by a single smart contact lens will be limited as a result of blinking by the wearer of the smart contact lens.

Blinking is a bodily function; it is a semi-autonomic rapid closing of the eyelid. A single blink is determined, in part, by the forceful closing of the eyelid. It is an essential function of the eye that helps spread tears across and remove irritants from the surface of the cornea and conjunctiva. In general individuals perform 10-20 blinking events per minute. A blinking event may also occur in response to a change in eye focus of a person. The duration of a blinking event is typically 100-400 milliseconds, or 0.1-0.4 second.

With the above limitation in mind, if multiple individuals are participating in collaborative capturing of video via smart contact lenses having the capability to record video, then there is an advantageous opportunity to predict the timing and duration of a blinking event for at least one participating individual who is currently capturing video and accordingly transfer the video capturing control to at least one other participating individual's smart contact lens, thus allowing for an uninterrupted video capture.

Embodiments of the invention propose a Collaborative Video Capture (CVC) System 100 by which multiple participating individuals will collaboratively capture video via smart contact lenses having the capability to record video. In embodiments of the invention, every smart contact lens of CVC System 100 will be paired to a respective mobile device. In embodiments of the invention, automatic time sharing (e.g., transfer of video capturing control) of a collaborative video capture process will be controlled based on occurring and predicted eye closing events (e.g., blinking events or any other eye closing event) of each and every participating individual. In embodiments of the invention, when CVC System 100 predicts that a participating individual with video capture control is about to blink, CVC System 100 will transfer video capturing control to a smart contact lens of at least one other participating individual in order to avoid any interruption in video capture due to blinking.

In a multi-user environment, if participating users want to capture video, in a collaborative manner, of their surroundings with smart contact lenses having the capability to record video, CVC System 100 will determine every participating user's relative position within the surrounding area and determine each and every user's blinking cycle. Information relating to the relative position and blinking cycle of participating users may be identified/determined, at least in part, by respective mobile devices of the participating users which are paired to respective smart contact lenses of the participating users. Based on the identified/determined relative positions and blinking cycles, the proposed CVC System 100 will adjust video capturing control among the participating users accordingly so that there is no interruption (e.g., blank or black frame) within the collaboratively captured video.

In a multi-user environment, the proposed CVC System 100 will analyze the blinking events of the participating users in order to determine a blinking pattern for each participating user and predict a next blinking event for each participating user. In embodiments of the invention, blinking events and blinking patterns are merely examples of eye closing events and eye closing patterns, respectively, that CVC System 100 will track and analyze in order to adjust video capturing control among the participating users accordingly so that there is no interruption (e.g., blank or black frame) within the collaboratively captured video. Furthermore, CVC system 100 may identify if any participating user is experiencing excessive blinking events (either because of a health problem or because of environmental conditions), and accordingly identify other appropriate users who can participate during a smart contact lens collaborative video capturing event. In embodiments of the invention, during a current or predicted eye closing event of a given participating user, CVC System 100 may identify, based on determined eye closing patterns, other nearby participating users who will be experiencing an eye-opening event (e.g., not blinking) at the same time as the given participating user's eye closing event (this can be determined by identifying other nearby participating users having a current or predicted eye closing event that does not overlap with the given participating user) and transfer video capture control among the other nearby participating users accordingly so that there is no interruption (e.g., blank or black frame) within the collaboratively captured video. CVC System 100 may identify other nearby participating users via the paired mobile devices of each participating user, which will share location information among each other and with CVC System 100.

In embodiments of the invention, using augmented reality capabilities of the smart contact lenses such as a display unit of the smart contact lens, the proposed CVC System 100 may suggest and indicate the direction of a relative repositioning of one or more participating users within the surrounding environment, so that uninterrupted video can be captured collaboratively via the smart contact lenses.

In embodiments of the invention, CVC System 100 may track, via the smart contact lens of a participating user, the accumulated tears on the eyes of the participating user. As the accumulation of tears over the smart contact lenses will affect the quality of video captured, CVC System 100 may identify appropriate other participating users within the collaborative environment who have less than (or equal to) a threshold level of tears accumulated in their eyes for control of the collaborative video capture process. In other words, CVC System 100 may transfer control of video capturing to a participating user(s) with less than (or equal to) a threshold level of tears accumulated in their eyes. CVC System 100 may provide augmented reality based notification both to the participating user(s) with an accumulation of tears in excess of the threshold level and to the identified participating user(s) with less than (or equal to) a threshold level of tears accumulated in their eyes.

In embodiments of the invention, in any multi participating user smart contact lens-based collaborative video capturing environment, the proposed CVC System 100 will identify the relative movement of one or more objects being captured with respect to a participating user's change in focus direction, and accordingly, based on predicted blinking durations and blinking cycles of the participating users, transfer the video capturing control from the participating user with the change in focus direction to another appropriate participating user so that there is no interruption in the captured video.

Implementation details of the proposed CVC System 100 are as follows:

A smart contact lens of CVC System 100 will have a sensor (e.g., a touch sensor) installed in the upper surface of the smart contact lens. The sensor will track the movement of a participating user's eyelid. Based on accumulated historical eyelid movement patterns of the participating user, the proposed CVC System 100 will predict the blinking cycle of the participating user, and the frequency of eye blinking for the participating user. CVC System 100 will determine such predictions for every participating user.

The position of a camera of the smart contact lens will be identified and the camera of the smart contact lens will capture the video. Around the camera of the smart contact lens there will be one or more photo-diode sensors, the one or more photodiode sensors will track the opening pattern of a participating user's eyelid when the user begins capturing the video (i.e., has control of video capture). The sensor feed from the one or more photo-diode sensors around the camera of the smart contact lens will determine how much light is falling on the eye based on the opening pattern of the eyes. Movement of the eyelid will control the opening pattern of the eyes, and thus control how light falls on the camera. The proposed CVC System 100 will track the blinking cycle of a user, and will identify when the user is about to close their eye.

A smart contact lens of CVC System 100 will be paired with a respective mobile device (e.g., a smartphone, a laptop, a tablet, a smartwatch, etc.) of a participating user, so that captured video will be transferred to the paired mobile device for storage within the paired mobile device. Captured video may also transferred by a mobile device having a network connection to a cloud server for storage in the cloud server. Using Near Field Communication (NFC) and the position of the paired mobile device (as may be determined by location services of the paired mobile device), the proposed CVC System 100 will identify the relative position of each and every user in the surrounding area. As the smart contact lens of every participating user is paired with a respective mobile device, CVC System 100 will share blinking cycles, blinking frequencies, and/or any captured information relating to other eye closing events of the participating users, among each other via the paired mobile devices.

The proposed CVC System 100 will track, via the smart contact lenses and paired mobile devices, the eyelid movement patterns (e.g., blinking patterns) of participating users and will also identify if any irregularities exist in the eyelid movement patterns, for example, in response to an environmental irritation or an eye rubbing action of a participating user.

In embodiments of the invention, when a participating user starts capturing video with a smart contact lens, the proposed CVC System 100 will track any eye closing events of the participating user based on one or more sensor feeds (e.g., touch sensor feed, photo-diode sensor feed) from the smart contact lens. CVC System 100 will determine one or more eye closing patterns (i.e., a blinking patterns) for the participating user based on information received from the one or more sensor feeds. Furthermore, CVC System 100 may predict when the camera of the participating user's smart contact lens is going to be covered based on the determined eye closing pattern(s).

In embodiments of the invention, in a multi-user environment, if multiple participating users want to capture video via smart contact lenses in order to skip the blinking durations of each user, the proposed CVC System 100 will identify the position and focus direction of every participating user.

In embodiments of the invention, in addition to parameters relating to blinking, the proposed CVC System 100 may identify, via a smart contact lens of a participating user, information relating to additional parameters of the participating user (e.g., accumulation of tear quantity, any irritation of the eye, etc.) and send the identified information to the respective paired mobile device of the participating user.

Based on the shared eye closing events (e.g., blinking pattern) of every participating user, the proposed CVC System 100 will also track, via the smart contact lenses and their respective paired mobile devices, the relative position and direction of focus towards the target object that is to be collaboratively captured.

In embodiments of the invention, CVC System 100 will determine a video capture time sharing (e.g., determined transfer of video capture control) among the participants so that uninterrupted video can be captured in a collaborative manner. The proposed system will also track, via the smart contact lenses and their respective paired mobile devices, eye opening and blinking patterns on a real-time basis, as well as any obstacle (e.g., a finger rubbing event) on a real-time basis, and will accordingly identify one or more participating users for video capture control. As a result of this identification, CVC System 100 will transfer the video capturing control to the one or more identified participating users resulting in uninterrupted captured video.

In embodiments of the invention, while performing video capture time sharing in a collaborative manner, the proposed CVC System 100 may use augmented reality capability of the smart contact lens, such as a display unit of the smart contact lens, to notify a participating user in advance of video capture control being transferred to their respective smart contact lens and to show appropriate indication to the participating user when video is being captured. Also, in embodiments of the invention, during collaborative video capturing by at least one participating user, CVC System 100 will notify the at least one participating user if any repositioning is required while capturing video via their respective smart contact lens. Such notification will be displayed to the at least one participating user via the augmented reality capability of the smart contact lens (e.g., a display unit of the smart contact lens) and will show the direction (e.g., a focus direction, a movement direction) recommendation for the at least one participating user to follow so that continued uninterrupted video of a target object/area can be captured in a collaborative manner.

In embodiments of the invention, while a target object of a surrounding environment is being captured in a collaborative manner via the smart contact lenses, the proposed CVC System 100 will track the relative speed and direction of movement of the target object and accordingly identify one or more appropriate participants who can continue to capture uninterrupted video, via the smart contact lenses, based on the tracked relative speed/direction of movement of the target object and the relative positions of the participant users.

In another embodiment of the proposed solution, a participant may be identified as primary video capture participant and the other participants may be assigned a priority value and marked as secondary video capture participants. CVC System 100 may implement an algorithm to assign a priority value based on factors such as proximity to the primary video capture participant. When the primary video capture participant is experiencing an eye closing event, due to blinking or finger rubbing actions, CVC System 100 may transfer video capture control one or more marked secondary video capture participants thereby allowing any missing frames captured by the primary video capture participant to be taken from the nearest secondary video capture participant having the missing frames available. This can be done as an offline process—either as a post processing step or a real time server which takes frames from different sources.

Embodiments of the present invention will now be described in detail with reference to the accompanying Figures.

FIG. 1A is a functional block diagram of Collaborative Video Capture (CVC) System 100, according to an example embodiment of the invention. CVC System 100 includes smart contact lenses 120 and 130, paired to respective mobile devices 129 and 139, connected via a network 110 to server 140. The devices may individually or in concert run one or more programs having programming instructions to perform one or more methods according to embodiments of the invention. An example application includes a collaborative video capturing application.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support a collaborative video capture process via smart contact lenses and may support communications between mobile device 129, mobile device 139, and server 140.

In an example embodiment, smart contact lens 120 and smart contact lens 130 may include a lens unit 121 (see FIG. 1B) having a curved-surface shape which can be fully worn on an eye (eyeball) and be removed therefrom. A circuit unit 123 (see FIG. 1B) and a display unit 128 (see FIG. 1C) are provided in the lens unit 121. A smooth portion made of transparent synthetic resin or the like is formed on an external side of the circuit unit 123 and the display unit 128 provided in the lens unit 121 (opposite direction of an eyeball contact surface of the lens unit 121). With this, when the user wears the smart contact lens 120 or the smart contact lens 130 on his/her eye, an eyelid of the user can be smoothly moved thereon. In an example embodiment, smart contact lens 120 and smart contact lens 130 are paired to respective mobiles, such as mobile device 129 and mobile device 139, via a wireless communication technology, for example, WiFi, Bluetooth, or Near Field Communication (NFC). Although CVC System 100 of FIG. 1A depicts two smart contact lenses, namely smart contact lenses 120 and 130, this is merely an example embodiment. In other embodiments, CVC System 100 may include a plurality of such smart contact lenses, each paired with a respective mobile device.

In an example embodiment, mobile device 129 and mobile device 139 may be a laptop computer, a notebook, a tablet computer, a netbook computer, a personal computer (PC), a desktop computer, a personal digital assistant (PDA), a smart phone, a wearable computing device, or any other electronic device or computing system capable of sending, and receiving data to and from other computing devices and smart devices such as smart contact lens 120, smart contact lens 130, and server 140, via network 110, and capable of supporting the functionality required of embodiments of the invention (e.g., collaborative video capture process via CVC System 100). For example, mobile device 129 and mobile device 139 may support a communication link (e.g., wired, wireless, direct, via a LAN, via the network 110, etc.) between smart contact lens 120, smart contact lens 130, and server 140. In an example embodiment, mobile device 129 and mobile device 139 are paired to respective smart contact lenses, such as smart contact lens 120 and smart contact lens 130, via a wireless communication technology, for example, WiFi, Bluetooth, or NFC. Data sent from mobile device 129 and mobile device 139 may include data received from smart contact lens 120 and smart contact lens 130, respectively. Data received by mobile device 129 and mobile device 139 may also include data sent, via network 110, from server 140, described below. Although CVC System 100 of FIG. 1A depicts two mobile devices, namely mobile device 129 and mobile device 139, this is merely an example embodiment. In other embodiments, CVC System 100 may include a plurality of such mobile devices, each paired with a respective smart contact lens. Mobile device 129 and mobile device 139 may be described, generally, with respect to FIG. 3 below. In an example embodiment, mobile device 129 and mobile device 139 may send, via network 110, data captured by respectively paired smart contact lens 120 and smart contact lens 130 to real time video capture manager 142 located on server 140. In an example embodiment, mobile device 129 and mobile device 139 may receive data from real time video capture manager 142 located on server 140.

In an example embodiment, server 140 may include real time video capture manager (RVCM) 142. Server 140 may be a desktop computer, a notebook, a laptop computer, a blade server, a networked computer appliance, a virtual device, or any other networked electronic device or computing system capable of receiving and sending data from and to other computing devices such as mobile device 129 and mobile device 139, via network 110, and capable of supporting the functionality required of embodiments of the invention. In an example embodiment, server 140 may function to process data received from mobile device 129 and mobile device 139, via network 110. While server 140 is shown as a single device, in other embodiments, server 140 may represent a cluster or plurality of servers, working together or working separately. Server 140 may be described generally with respect to FIG. 3 below.

In an example embodiment, RVCM 142 may be a program, or subroutine contained in a program, that may operate to receive data from smart contact lens 120 and smart contact lens 130, via respectively paired mobile devices 129 and 139, and dynamically direct control of collaboratively captured video among smart contact lens 120 and smart contact lens 130 based on the received data. In an example embodiment, RVCM 142 may receive, via mobile devices 129 & 139 and network 110, data relating to blinking patterns and other eye closing events of persons wearing smart contact lens 120 and smart contact lens 130 for the purpose of capturing video in a collaborative manner. Additionally, RVCM 142 may initiate collaborative video by at least one smart contact lens (e.g., smart contact lens 120 and/or smart contact lens 130) and receive, via at least one paired mobile device (e.g., mobile device 129 and/or mobile device 139) and network 110, video captured by the at least one smart contact lens. Based on the received data, RVCM 142 may determine to transfer control of video capture among smart contact lens 120 and smart contact 130 so that there are no interruptions (i.e., black video frames) in the captured video. Furthermore, in an example embodiment, RVCM 142 may communicate these determinations to smart contact lens 120 and/or smart contact lens 130 via mobile devices 129 & 139 and network 110. The operations and functions of real time video capture manager 142 are described in further detail below with regard to FIG. 2.

Figure 1B:
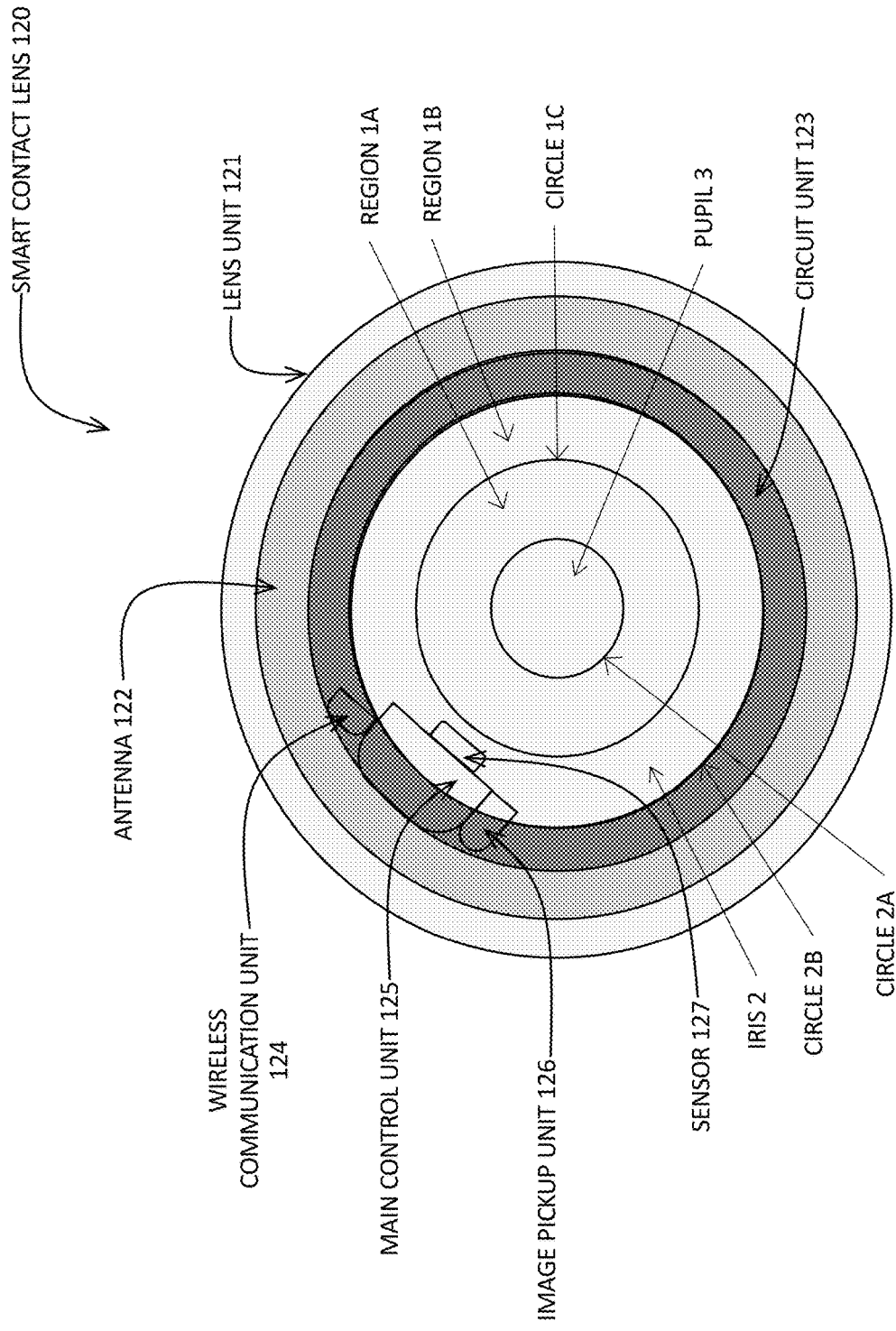
FIG. 1B depicts a planar view of an example configuration of the smart contact lens of the CVC System of FIG. 1A, in accordance with an embodiment of the present invention.

FIG. 1B depicts an example embodiment of the smart contact lens 120 of FIG. 1A. FIG. 1B is a planar view illustrating an example of an appearance configuration of smart contact lens 120 according to an embodiment of the present disclosure. As illustrated in FIG. 1B, the contact lens 120 according to this embodiment includes the lens unit 121 worn on the eyeball and is divided into two regions, i.e., a region 1A on an inner side of a circle 1C and a region 1B on an outer side thereof, seen from the front of the eyeball. A diameter D2 (not shown) of the circle 1C is substantially equal to or larger than a maximum diameter D1 (not shown) of an inner circle 2A of an iris 2 of a human eye. The display unit 128 that displays an image is provided in at least the region 1A as described below with reference to FIG. 1C. In an example embodiment, FIG. 1B may also be representative of smart contact lens 130 of FIG. 1A.

Figure 1C:
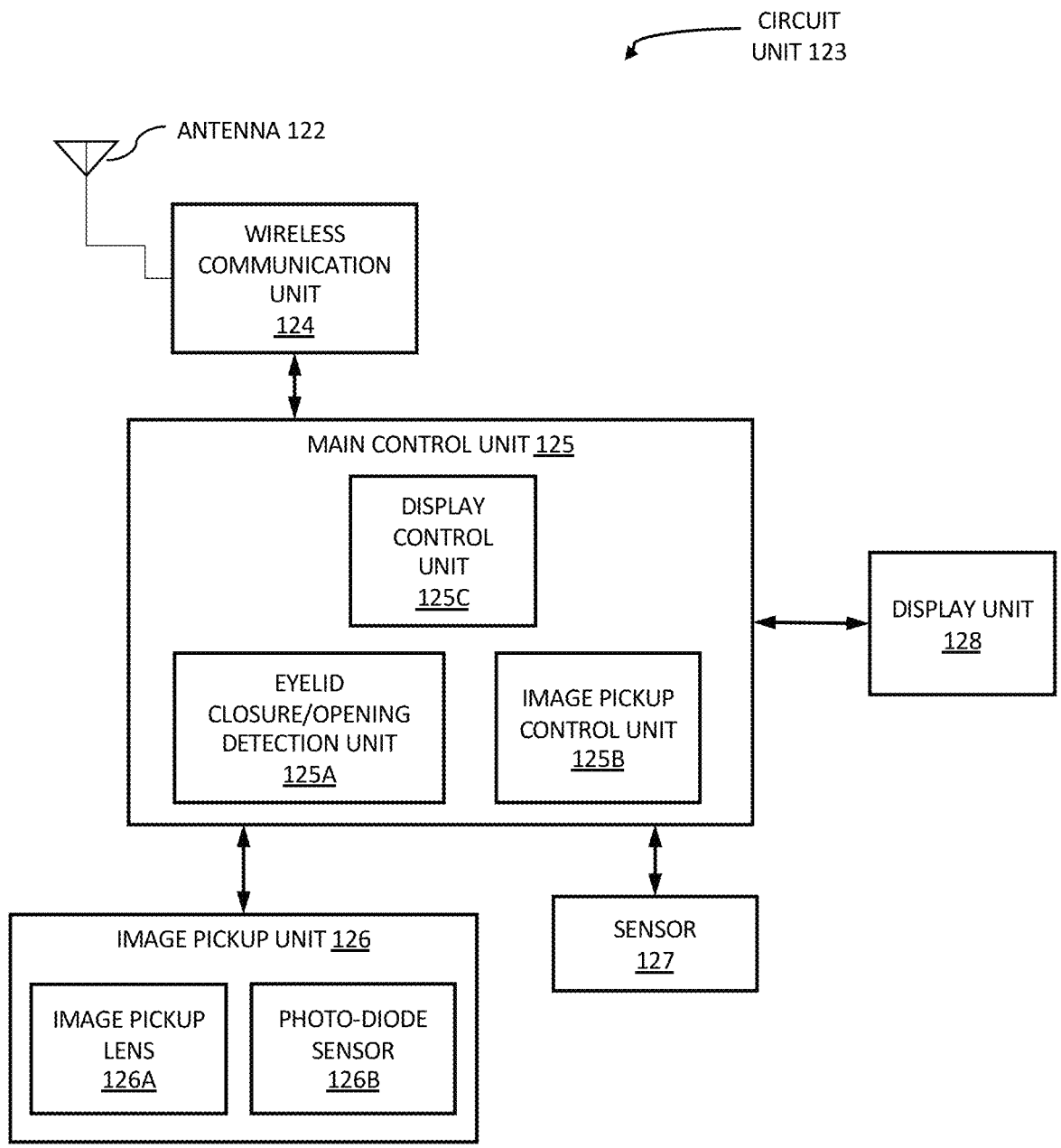
FIG. 1C is a block diagram illustrating an example of a functional configuration of the circuit unit of the smart contact lens of FIG. 1B, in accordance with an embodiment of the present invention.

In an example embodiment, the circuit unit 123, which will be described below with reference to FIG. 1C, is provided in the region 1B on the outer side of the circle 1C. The circuit unit 123 includes a main control unit 125, a wireless communication unit 124, an antenna 122, an image pickup unit 126 including an image pickup lens 126A, and a sensor 127. The circuit unit 123 is provided in the region 1B that is an outer circumference of the display unit 128 so as not to obstruct image display using the display unit 128.

In an example embodiment, the main control unit 125 includes, for example, a microcomputer (microchip, IC chip) including a central processing unit (CPU), a read only memory (ROM), and a random access memory (RAM) and controls each configuration of the circuit unit 123. For example, the main control unit 125 controls the image pickup unit 126. Further, the main control unit 125 supplies an image signal to the display unit 128 and performs display control. A specific configuration of the main control unit 125 according to this embodiment will be described below with reference to FIG. 1C.

In an example embodiment, the antenna 122 is wirelessly connected to an external device and has a function of transmitting and receiving data and a function of supplying and receiving electric power. The external device is, for example, mobile device 129 of FIG. 1A which exists in the vicinity of smart contact lens 120. Supply and reception of electric power can be achieved by, for example, an electromagnetic induction method, a radio wave method, or an electromagnetic field resonance method.

In an example embodiment, the wireless communication unit 124 has a function of performing various kinds of signal processing with respect to data transmitted and received by antenna 122 and a function of performing processing of supply and reception of electric power using antenna 122. For example, the wireless communication unit 124 transmits captured video and data related to eye closing events (e.g., blinking) to an external device such as mobile device 129.

In an example embodiment, image pickup unit 126 includes, for example, a lens system including the image pickup lens 126A, an aperture stop, a zoom lens, a focus lens, and the like, a drive system that causes the lens system to perform focusing operation and zooming operation, and a solid-state image pickup element array that performs photoelectric conversion with respect to image pickup light obtained in the lens system to thereby generate an image pickup signal. The Solid-state image pickup element array may be realized by, for example, a charge coupled device (CCD) sensor array or a complementary metal oxide semiconductor (CMOS) sensor array.

As illustrated in FIG. 1B, the image pickup lens 126A is provided so that a gaze direction of the user who wears the smart contact lens 120 is an image pickup direction. In an example embodiment, the image pickup unit 126 includes an image pickup signal processing unit (not shown) that performs processing with respect to a signal obtained by a solid-state image pickup element to thereby obtain an image pickup signal serving as digital data. For example, the image pickup signal processing unit may perform image stabilization for correcting blur of captured video, the blur being caused by motion of the eyeball. The image pickup unit 126 outputs the acquired captured video (digital data) to the main control unit 125.

In an example embodiment, the sensor 127 is any one of various kinds of sensors for sensing external environment (peripheral) information of smart contact lens 120 and is, for example, a touch sensor, a piezoelectric sensor (example of pressure sensor), an infrared sensor, an acceleration sensor, a gyro sensor (example of tilt sensor), or an ocular potential measurement unit. In an example embodiment, sensor 27 outputs a sensing result to the main control unit 125.

In the above description, the configuration of the circuit unit 123 provided in the lens unit 121 of the smart contact lens 120 has been described. Note that the configuration of the circuit unit 123 is not limited to the example illustrated in FIG. 1B. Further, the circuit unit 123 may be a configuration that includes a battery. Further, arrangement of configurations of the circuit unit 123 illustrated in FIG. 1B is merely an example, and the circuit unit 123 according to this embodiment may have arrangement that is different from the arrangement of FIG. 1B.

In an example embodiment, display unit 128 of FIG. 1C includes a plurality of display elements (not shown). Each display element includes, for example, a liquid crystal display device, an organic electroluminescence (EL) display device, or a field emission display (FED) display device. Display elements of display unit 128 may be arranged in a matrix on a curved surface (e.g., substantially spherical curved surface) corresponding to a surface of a human eye. Display elements of display unit 128 have respective display regions (not shown) and may display independent images, respectively, or all the display elements may display a single image. The display regions are placed in the whole region 1A in the circle 1C. With this, the diameter D2 of the circle 1C is equal to or larger than a maximum diameter D1 of a pupil 3 (maximum diameter of the inner circle 2A of the iris 2), and therefore the display regions always exist over the whole pupil 3 regardless of a value of the diameter of the inner circle 2A of the iris 2. Therefore, light of images of the display regions are securely formed on a retina of the eyeball. Note that, although the diameter D2 of the circle 1C has a value smaller than a diameter D3 (not shown) of an outer circle 2B of the iris 2 in this embodiment, the diameter D2 may be larger than the diameter D3. The display unit 128 allows external light to be transmitted therethrough when the display unit does not display an image, and therefore the user can visually recognize an image of the outside (scene of real space).

FIG. 1C is a block diagram showing an example of the functional configuration of the smart contact lens 120 according to an example embodiment. As shown in FIG. 1C, the smart contact lens 120 includes the circuit unit 123 which includes the main control unit 125, the wireless communication unit 124, the antenna 122, the image pickup unit 126, the sensor 127, and the display unit 128. Note that the wireless communication unit 124, the antenna 122, the image pickup unit 126, the display unit 128, and the sensor 127 have been described with reference to FIG. 1B. As illustrated in FIG. 1C, the main control unit 125 functions as an eyelid closure/opening detection unit 125A, an image pickup control unit 125B, and a display control unit 125C.

In an example embodiment, the image pickup control unit 125B controls operation of the image pickup unit 126. For example, the image pickup control unit 125B performs ON/OFF control of operation of the image pickup unit 126 and control (motor control) for causing the image pickup unit 126 to execute operation such as autofocus, automatic exposure adjustment, aperture stop adjustment, and zooming. Further, the image pickup control unit 125B performs control of image pickup sensitivity and signal processing in a solid-state image pickup element. Furthermore, in an example embodiment, the image pickup control unit 125B can acquire a through image (captured image) by successively converting image pickup light that is continuously obtained into digital data. Further, the image pickup control unit 125B can control the image pickup unit 126 so as to capture an image in the case where eyelid closure (e.g., blinking) is detected by the eyelid closure/opening detection unit 125A. In an example embodiment, the image pickup control unit 125B may perform predetermined image pickup control in accordance with a sensing result from the sensor 127.

In an example embodiment, the eyelid closure/opening detection unit 125A detects opening and closure of the eyelid that is in contact with the lens unit 121 and outputs a detection result to the image pickup control unit 125B. Opening and closure of the eyelid may be detected on the basis of a sensing result from the sensor 27. In an example embodiment, the eyelid closure/opening detection unit 125A may detect opening and closure of the eyelid in accordance with output from a piezoelectric sensor (an example of sensor 127) provided in the lens unit 121. At the time of opening or closing the eyelid, the eyelid is brought into contact with the lens unit 121 and a pressure is generated. Therefore, in the case where a value exceeding a threshold is detected by the piezoelectric sensor, the eyelid closure/opening detection unit 125A can detect closure of the eyelid. The eyelid closure/opening detection unit 125A can also detect eyelid closure/eyelid opening on the basis of a value of an ocular potential. In an example embodiment, eyelid closure/opening detection unit 125A may detect that the eyelid is closed/opened not only in the case where the eyelid is completely closed/opened, but also in the case where the eyelid is being closed/opened (e.g., as a result of blinking).

In an example embodiment, display control unit 125C performs control so that an image is displayed on the display unit 128. The display control unit 125C can control the display of above-mentioned augmented reality capabilities via the display unit 128 and control a display direction of the captured video to be displayed on the display unit 128.

Figure 2:
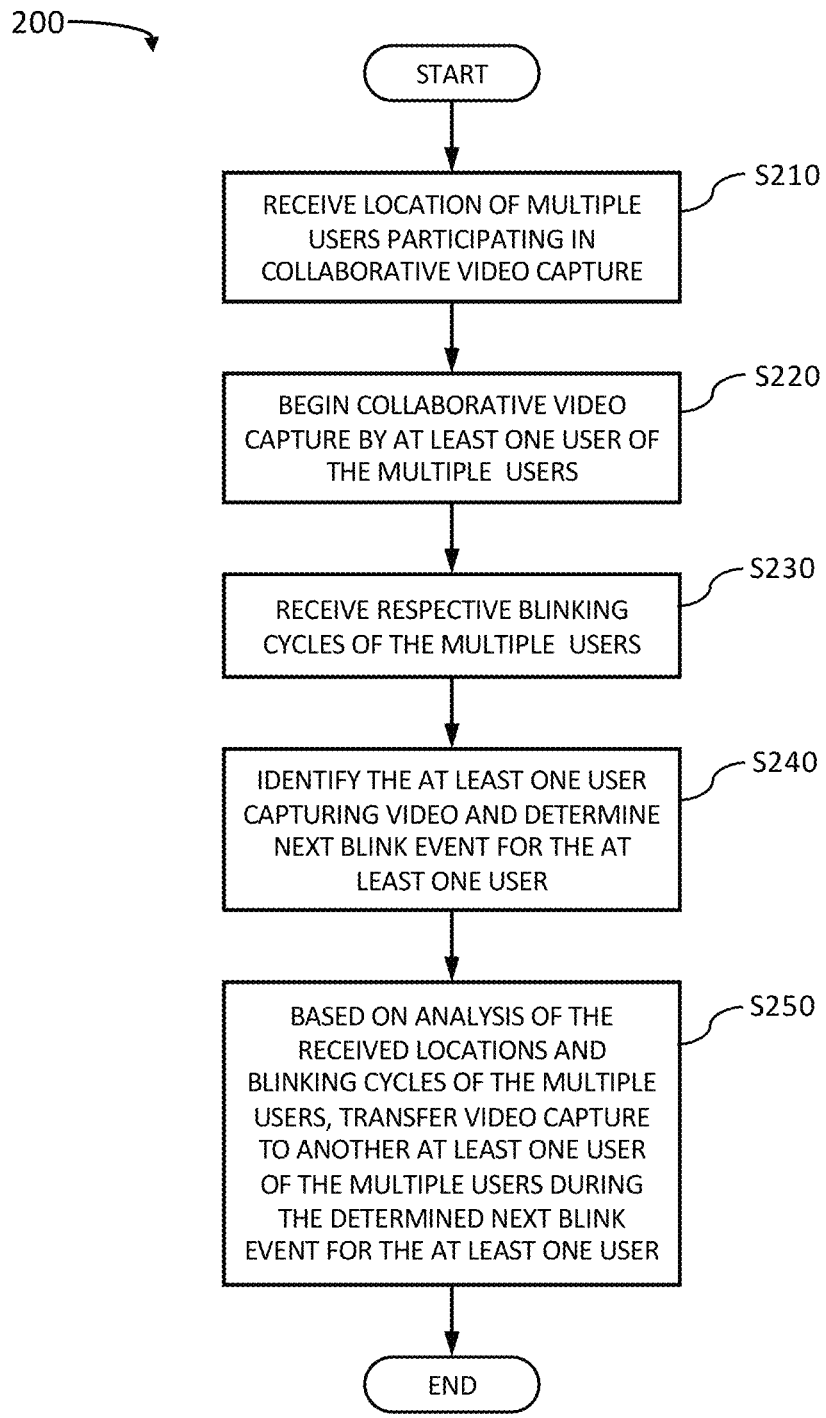
FIG. 2 is a flowchart illustrating the operations of the real time video capture manager of FIG. 1A, in accordance with an embodiment of the invention.

FIG. 2 shows a flowchart of a method illustrating the operations of real time video capture manager (RVCM) 142 in accordance with an example embodiment of the invention. The method 200 begins with step S210 in which RVCM 142 receives the location information of multiple users participating in a collaborative video capture process via respective smart contact lenses such as smart contact lens 120 and smart contact lens 130. Each participant is wearing a smart contact lens such as smart contact lens 120 and smart contact lens 130 and each participant has a respective mobile device, such as mobile device 129 and mobile device 139, which is paired to the smart contact lens of the user. The geographic location of a user may be determined by the mobile device of the user (e.g., via GPS or location services of the mobile device) and communicated to RVCM 142 via network 110 and server 140. In an example embodiment, RVCM 142 receives location information of a user of smart contact lens 120 and a user of smart contact lens 130 from paired mobile device 129 and paired mobile device 139, respectively.

Referring to step S220, RVCM 142 begins the collaborative video capture process by smart contact lens 120 and/or smart contact lens 130. In an example embodiment, at least one participating user (e.g., user of smart lens 120, user of smart contact lens 130) has initial video capture control, in other words, a smart contact lens of at least one participating user is currently capturing video via their smart contact lens and is transmitting the captured video to RVCM 142 via their mobile device (which is paired to their smart contact lens) and network 110. In an example embodiment, the main control unit 125 of smart contact lens 120 may, as a result of receiving a trigger signal from paired mobile device 129, activate smart contact lens 120 for video capture control. The trigger signal is received by smart contact lens 120 via the antenna 122. Furthermore, in an example embodiment, RVCM 142 directs mobile device 129 to transmit the trigger signal to smart contact lens 120. Additionally, RVCM 142 may direct a mobile device to transmit a signal to a paired smart contact lens which deactivates the smart contact lens for video capture control.

Referring to step S230, RVCM 142 receives information relating to eye closing events of the multiple users participating in the collaborative video capture process via respective smart contact lenses such as smart contact lens 120 and smart contact lens 130. The information relating to eye closing events received by RVCM 142 may include information on blinking cycles for each of the participating users. In an example embodiment, such information (e.g., information on the blinking cycle of the wearer of smart contact lens 120) may be obtained from sensors (e.g., photo-diode sensor 126B and/or sensor 127) of smart contact lens 120 and transmitted to paired mobile device 129, which in turn transmits the information to RVCM 142, via network 110. In a similar manner, RVCM 142 receives information relating to eye closing events for every participating user from their respective mobile devices.

Referring to step S240, RVCM 142 identifies the at least one participating user currently capturing video via their smart contact lens and determines the next eye closing event (i.e., blink event) for the identified at least one user. Furthermore, in step S240, RVCM 142 analyzes the received location information of every participating user as well as the received information relating to eye closing events for every participating user. As a result of this analysis, RVCM 142 determines on or more eye closing patterns for every participating user and predicts future eye closing events for every participating user. For example, RVCM 142 may determine one or more blinking patterns for every participating user as well as predict future blinking events for every participating user. In an example embodiment, RVCM 142 identifies smart contact lens 120 as currently capturing video. Furthermore, in response to receiving location information and information relating to eye closing events for the wearer of smart contact lens 120, RVCM 142 determines a blinking pattern for the wearer and predicts a next blink event of the wearer.

Referring to step S250, based on the determined eye closing pattern(s) for every participating user and/or the predicted next eye closing event(s) for every participating user (resulting from analysis performed in step S240 of the received location information as well as the received information relating to eye closing events), RVCM 142 transfers video capture control to a smart contact lens of another at least one participating user having a predicted next eye closing event which does not overlap with the predicted next eye closing event for the identified at least one participating user currently capturing video. RVCM 142 may cause the transfer of video capture control by a smart contact lens (e.g., smart contact lens 120) through one or more commands/trigger signals sent, via network 110, to a respective mobile device paired to the smart contact lens (e.g., mobile device 129). RVCM 142 transfers video capture control in this manner so that uninterrupted video may be collaboratively captured by the participating users. In an example embodiment, based on the determined blinking pattern and/or predicted next blink event of the wearer of smart contact lens 120, RVCM 142 transfers video capture control to smart contact lens 130, the wearer of which is predicted to have a next blink event that does not overlap with the predicted next blink event for the wearer of smart contact lens 120, during the predicted next blink event of the wearer of smart contact lens 120. In do so, RVCM 142 ensures uninterrupted video collaboratively captured by the wearer of smart contact lens 120 and the wearer of smart contact lens 130 as any potentially missed or black video frames elapsing during the predicted next blink event of the wearer of smart contact lens 120 is captured by the wearer of smart contact lens 130.

Figure 3:
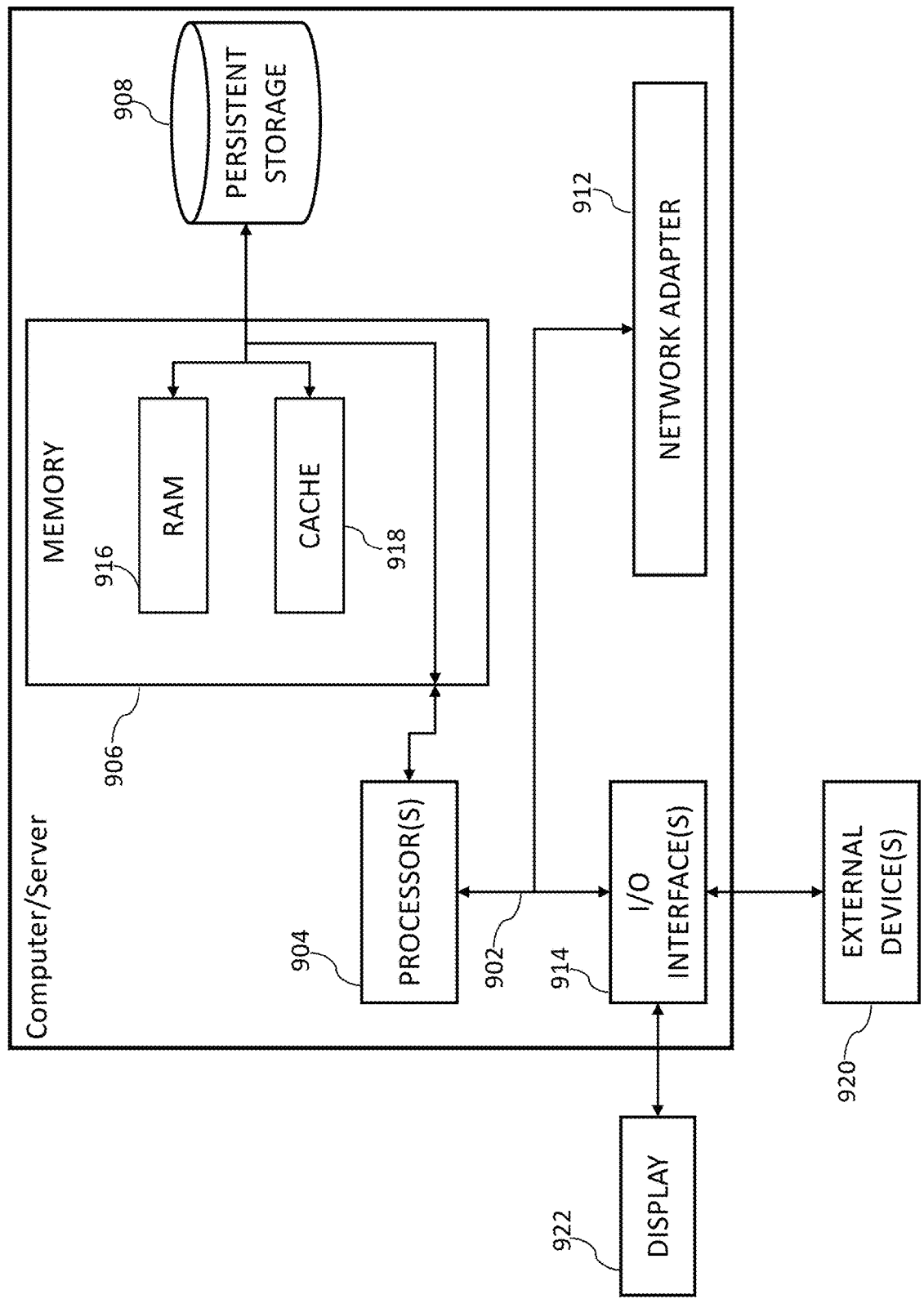
FIG. 3 is a block diagram depicting the hardware components of the CVC System of FIG. 1A, in accordance with an embodiment of the invention.

FIG. 3 depicts a block diagram of components of mobile device 129, mobile device 139, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Mobile device 129, mobile device 139, and server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The program real time video capture manager 142 in server 140 is stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The program real time video capture manager 142 in server 140 may be downloaded to persistent storage 908 through network adapter 912.

I/O interface(s) 914 allows for input and output of data with other devices that may be connected to mobile device 129, mobile device 139, and server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., program real time video capture manager 142 in server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
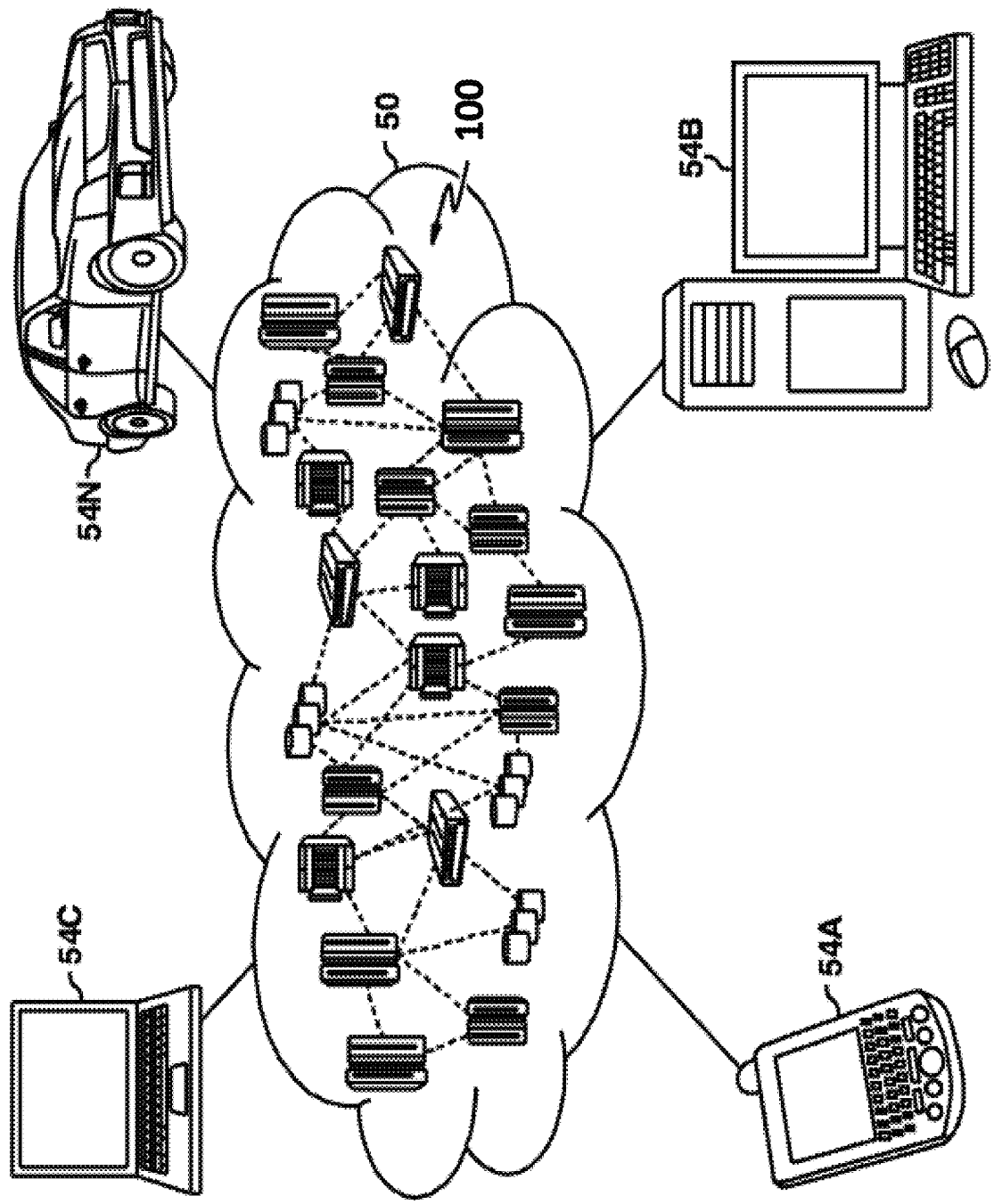
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
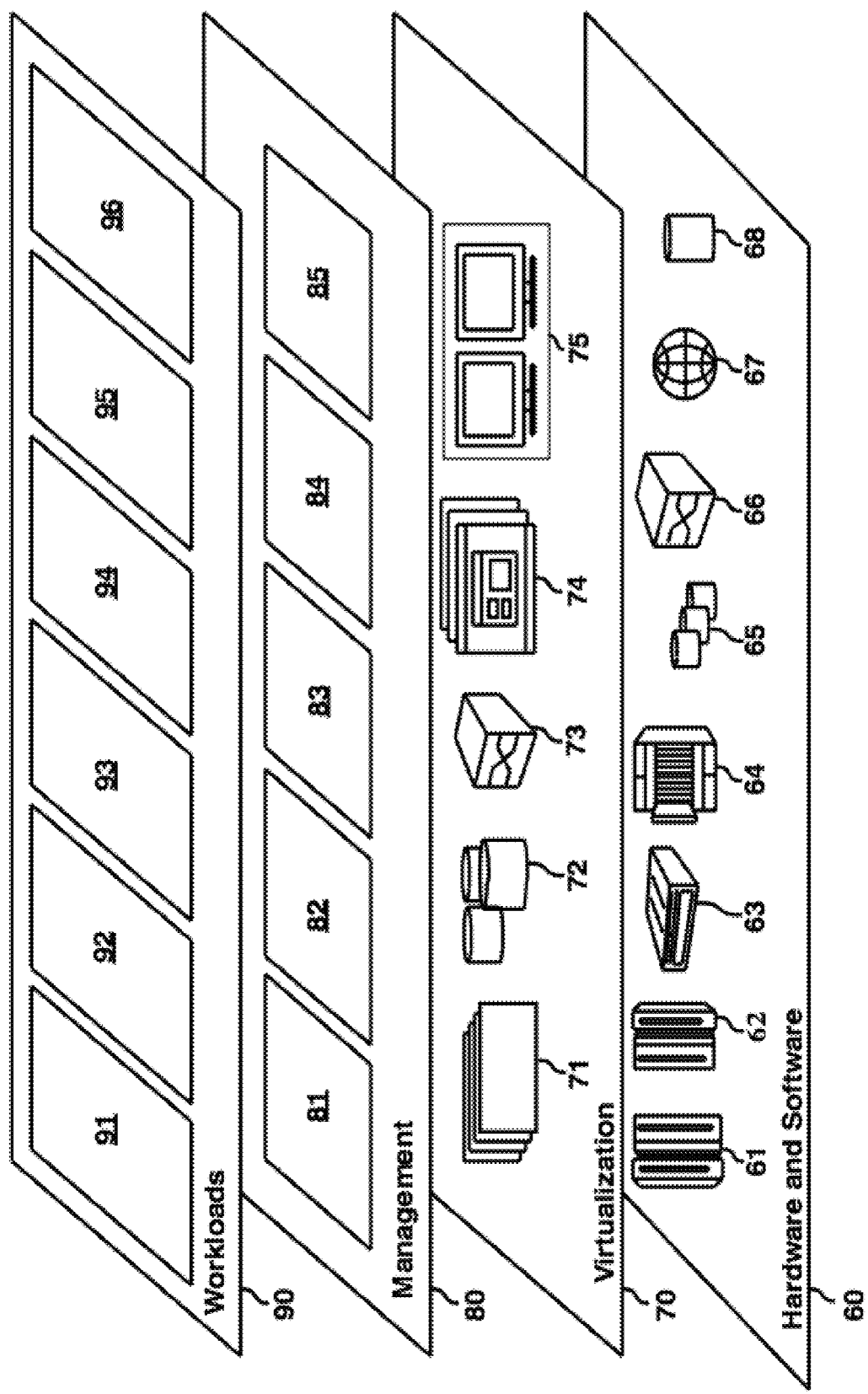
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative video capture system 96. Collaborative video capture system 96 may relate to a collaborative video capture process for capturing video via smart contact lenses worn by multiple participating individuals.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer-implemented method for collaborative video capturing via multiple smart contact lenses, the method comprising:
   identifying a participant, of multiple participants, currently capturing video via a smart contact lens of the identified participant;
   in response to a predicted next eye closing event for the identified participant, transferring current video capture to a smart contact lens of another participant, of the multiple participants, during the predicted next eye closing event for the identified participant.

2. The computer-implemented method of claim 1, further comprising:
   identifying the another participant based on a predicted next eye closing event of the another participant that does not overlap with the predicted next eye closing event for the identified participant.

3. The computer-implemented method of claim 1, further comprising:
   receiving location information for the multiple participants, wherein the multiple participants are participants of a collaborative video capture process, and wherein every participant, of the multiple participants, is wearing a smart contact lens paired with a respective mobile device;
   receiving eye closing event information for one or more of the multiple participants, wherein the received location information and the received eye closing event information are sent by the respective mobile device of the one or more of the multiple participants; and
   determining an eye closing pattern and predicting a next eye closing event for one or more of the multiple participants, based on analysis of the received location information and the received eye closing event information.

4. The computer-implemented method of claim 3, wherein eye closing event information comprises information relating to blinking, and wherein the eye closing pattern comprises a blinking pattern, and wherein the next eye closing event comprises a next blinking event.

5. The computer-implemented method of claim 1, wherein every smart contact lens of the multiple smart contact lenses comprises a main control unit, a camera, an antenna, a wireless communication unit, and at least one sensor.

6. The computer-implemented method of claim 3, wherein an eye closing event is detected by a touch sensor of a smart contact lens, and wherein information relating to a detected eye closing event is transmitted by the smart contact lens to a paired mobile device.

7. The computer-implemented method of claim 3, wherein the multiple participants of the collaborative video capture process share their respective location information and their respective eye closing event information among themselves via their respective mobile devices.

8. A computer program product for collaborative video capturing via multiple smart contact lenses, the computer program product comprising:
one or more computer-readable tangible storage devices and program instructions stored on at least one of the one or more computer-readable tangible storage devices, wherein the program instructions are executable by a computer, the program instructions comprising:
program instructions to identify a participant, of multiple participants, currently capturing video via a smart contact lens of the identified participant; and
in response to a predicted next eye closing event for the identified participant, program instructions to transfer current video capture to a smart contact lens of another participant, of the multiple participants, during the predicted next eye closing event for the identified participant.

9. The computer program product of claim 8, further comprising:
program instructions to identify the another participant based on a predicted next eye closing event of the another participant that does not overlap with the predicted next eye closing event for the identified participant.

10. The computer program product of claim 8, further comprising:
program instructions to receive location information for the multiple participants, wherein the multiple participants are participants of a collaborative video capture process, and wherein every participant, of the multiple participants, is wearing a smart contact lens paired with a respective mobile device;
program instructions to receive eye closing event information for one or more of the multiple participants, wherein the received location information and the received eye closing event information are sent by the respective mobile device of the one or more of the multiple participants; and
program instructions to determine an eye closing pattern and predicting a next eye closing event for one or more of the multiple participants, based on analysis of the received location information and the received eye closing event information.

11. The computer program product of claim 10, wherein eye closing event information comprises information relating to blinking, and wherein the eye closing pattern comprises a blinking pattern, and wherein the next eye closing event comprises a next blinking event.

12. The computer program product of claim 8, wherein every smart contact lens of the multiple smart contact lenses comprises a main control unit, a camera, an antenna, a wireless communication unit, and at least one sensor.

13. The computer program product of claim 10, wherein an eye closing event is detected by a touch sensor of a smart contact lens, and wherein information relating to a detected eye closing event is transmitted by the smart contact lens to a paired mobile device.

14. The computer program product of claim 10, wherein the multiple participants of collaborative video capture share their respective location information and their respective eye closing event information among themselves via their respective mobile devices.

15. A computer system for collaborative video capturing via multiple smart contact lenses, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to identify a participant, of multiple participants, currently capturing video via a smart contact lens of the identified participant; and
in response to a predicted next eye closing event for the identified participant, program instructions to transfer current video capture to a smart contact lens of another participant, of the multiple participants, during the predicted next eye closing event for the identified participant.

16. The computer system of claim 15, further comprising:
program instructions to identify the another participant based on a predicted next eye closing event of the another participant that does not overlap with the predicted next eye closing event for the identified participant.

17. The computer system of claim 15, further comprising:
program instructions to receive location information for the multiple participants, wherein the multiple participants are participants of a collaborative video capture process, and wherein every participant, of the multiple participants, is wearing a smart contact lens paired with a respective mobile device;
program instructions to receive eye closing event information for one or more of the multiple participants, wherein the received location information and the received eye closing event information are sent by the respective mobile device of the one or more of the multiple participants; and
program instructions to determine an eye closing pattern and predicting a next eye closing event for one or more of the multiple participants, based on analysis of the received location information and the received eye closing event information.

18. The computer system of claim 17, wherein eye closing event information comprises information relating to blinking, and wherein the eye closing pattern comprises a blinking pattern, and wherein the next eye closing event comprises a next blinking event.

19. The computer system of claim 17, wherein an eye closing event is detected by a touch sensor of a smart contact lens, and wherein information relating to a detected eye closing event is transmitted by the smart contact lens to a paired mobile device.

20. The computer system of claim 17, wherein the multiple participants of collaborative video capture share their respective location information and their respective eye closing event information among themselves via their respective mobile devices.

* * * * *